Figure 1:
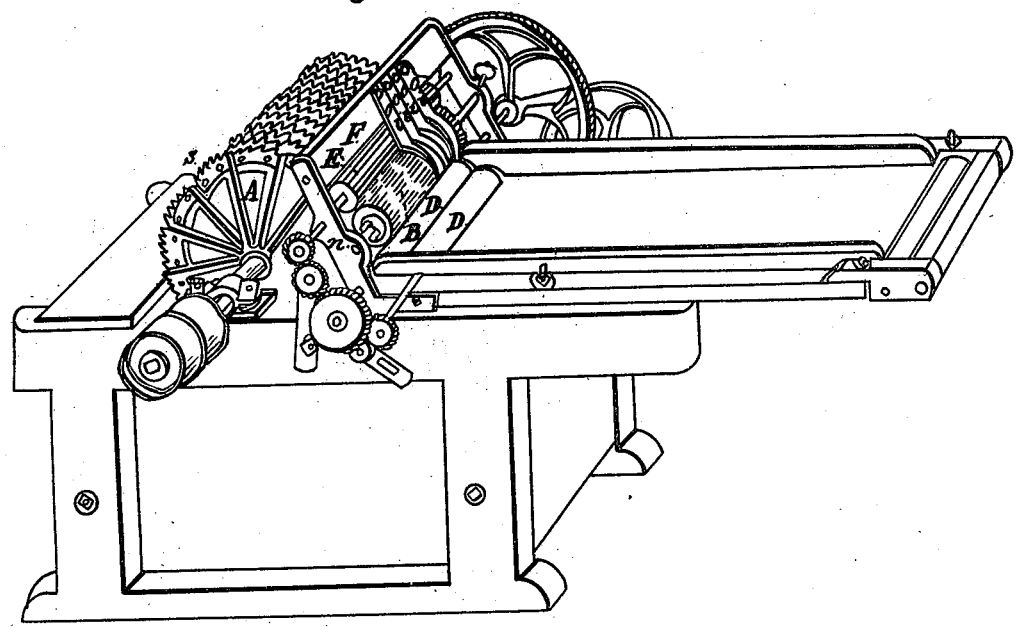

E. & G. C. KELLOGG.
WOOL PICKER.

No. 5,484.  PATENTED MAR. 28, 1848.

UNITED STATES PATENT OFFICE.

EDWD. KELLOGG AND GEO. C. KELLOGG, OF NEW HARTFORD, CONNECTICUT.

WOOL-PICKER.

Specification of Letters Patent No. 5,484, dated March 28, 1848.

*To all whom it may concern:*

Be it known that I, EDWARD KELLOGG, jointly and together with my father, GEORGE C. KELLOGG, both of New Hartford, in the county of Litchfield and State of Connecticut, did in his lifetime invent a new and useful Improvement in Picking-Machines; and I do hereby declare that the following is a full and exact description.

The nature of our improvement consists in the better construction and adaptation of the main spur cylinder and the feeders of the "shell and ratchet" picker heretofore invented and secured by Letters Patent to the said George C. Kellogg and Phineas Gillett dated October 30th, 1839, so that it is enabled much more effectively to open, straighten and separate the fiber of "hand work" so called, or pieces of woven, twisted or otherwise closely matted fibrous substances, to prepare them for manufacturing purposes.

To enable others skilled in machinery for manufacturing wool and cotton and such like fabrics to make and use our invention, I will proceed to describe its construction and operation.

Our main spun cylinder, or picking cylinder, is constructed of a series of rings of cast iron, or other suitable metal, fitted to, and placed successively upon, a common axis or shaft, and each ring fastened to the shaft by any of the usual methods, and when a number of them are so placed and fastened, near together in succession on the shaft, the pack, or series together form a cylinder, and on the outer edge of each ring the picking teeth are set and fastened firmly, whatever kind of teeth may be used, whether spikes, or serrated plates; though we generally prefer the plates with pointed teeth resembling saw-teeth. These rows of pointed teeth must not follow each other around the cylinder in lines corresponding with its plane of rotation, but must be set obliquely to said plane, and if this obliquity is constantly in the same direction, the lines of teeth will form a kind of spiral or screw-like succession, and if it is partly in each direction, to the right, and to the left, the points will follow each other in a zig-zag succession around the cylinder. And any judicious machinist can form the rings, of which the cylinder is composed, so as to correspond with either the spiral or the zig-zag order of succession, and either of these will answer the purpose well, the rings which are represented in the drawings, both at A in the cylinder in Figure 1, and at A in section Fig. 2 in which a whole circuit of plate teeth in segments S, S, &c., are shown with their fastenings, in which the segments correspond with the spiral order of arrangement.

Figure 2:
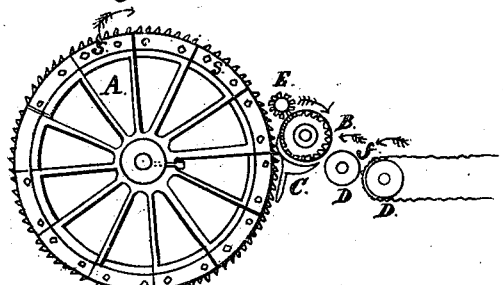
Figure 3:
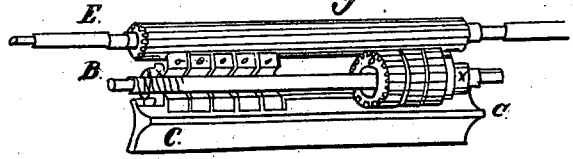

Our feeder consists principally of a packer or series of wheels, like spur gear-wheels, having their plane sides turned flat and smooth so as to fit well together, especially at their outer edges, and having their center holes much larger than the shaft which passes through them to bind the pack together, but is stationary, and the wheels revolve around it, being moved by the long pinion as shown in section in Fig. 2 at E and also in Fig. 3 at E; on each end of the stationary shaft B, near the bearings at *x, x,* in Fig. 3, are washer nuts to press the pack of feeder-wheels together so as to touch each other lightly on their flat sides, as shown partly in section in a plane perpendicular to their axes at *o, o, o,* &c., so that each wheel of the pack may be free to slip against its next, independently of each other, and rise and fall alone from the shell C, and maintain its own line or track of pressure on the feed, which passes between the shell and the pack, whether the feed is of even thickness in its whole breadth or not, that by this means every part of the feed may be holden between the shell and the feeder as it passes forward to the picking cylinder.

The long pinion shown in place at E in Fig. 1 and in transverse section at E in Fig. 2 and in sectional perspective at E in Fig. 3 resembles a deep-fluted roller; and the feeder, when packed, also resembles a fluted roller fitted to gear with the pinion, and moved by it, and the pinion has its rotary motion by belts and gearing from the main cylinder in any of the usual methods in such kinds of machinery.

The shell, shown in transverse section at C, in Fig. 2 and in longitudinal section at C, C, in Fig. 3, has a hollow curve on its upper side suited to the feeder, and also a larger hollow curve on the side next to the main cylinder, and fitting to it, and it should be set about as near to it as it can be and not touch the points of the teeth and so fastened that it may be varied a very small distance, from or to, the picking points as the work may require, at the direction of the workman, its upper edge should be thin but not sharp and smoothly rounded, that the feed may be holden as near to the picking point as practicable, and not cut and shorten the fiber too much.

In the perspective drawing Fig. 1 at F is shown the feeder-frame, in which is placed the long pinion E and the sectional feeder B and at least one of the creeper rollers D. And to the upper bar of which are attached as many springs as there are sections, or spur-wheels in the feeder (which may be more or less) and each spring partly embraces and acts upon its wheel to press it upon the feed; a number of these springs are represented in place in Fig. 1 at *i i i*, &c., and each of them being fastened at its upper end to the upper bar of the feeder-frame, has a thumb screw passing through it and screwing into said upper bar, so as to force the spring to press its wheel upon the feed as before described.

D D in Fig. 1 show the creeper rollers in place, in the feeding table, one to bring forward the feed on a creeper cloth or feeding apron, and the other, revolving in the same direction, to carry it fully up between the shell and feeder, and D, D, in Fig. 2 show the same in section, with a sketch of creeper cloth, and of the feed *f* as it is carried to its picking point.

The gears may be variously arranged by any machinist to give the proper motions to the cylinder, feeder, and rollers as indicated by the arrows in Fig. 2 and need no more particular description.

We claim several improvements on the "shell and ratchet wool picker" heretofore patented to Geo. C. Kellogg and Phineas Gillett, and assigned to said Geo. C. Kellogg, by Letters Patent dated October 30, 1839, but to said original invention or any parts thereof we make no claim. But

What we do claim in behalf as aforesaid as our invention and desire to secure by Letters Patent, is—

1. The construction of the main cylinder entirely of cast iron or other suitable metal fitted to receive oblique segments of saw-like teeth, or oblique rows of spike teeth: said cylinder being composed of a succession of wheels or rings placed on a common shaft or axis.

2. And also the sectional feeder, composed of a number of gear-like spur wheels, packed together in the form of a small cylinder, and not made firm on the shaft, but having holes in their centers much larger than the shaft, so that each wheel, being actuated by a separate spring, may rise and fall, or approach and recede from the shell separately, so as to press and hold upon all parts of an uneven feed, while the main picking cylinder acts upon it, as herein before described and represented.

EDWARD KELLOGG.

Witnesses:
SANFORD B. KELLOGG,
WAIT GARRET.